June 13, 1944.  J. L. PERELES  2,351,454
APPARATUS FOR FORMING SHOE HEELS
Filed July 24, 1941   2 Sheets-Sheet 1

INVENTOR.
Joseph L. Pereles,
BY Morsell & Morsell
ATTORNEYS

June 13, 1944. J. L. PERELES 2,351,454
APPARATUS FOR FORMING SHOE HEELS
Filed July 24, 1941   2 Sheets-Sheet 2

INVENTOR.
Joseph L. Pereles,
BY Morsell & Morsell
ATTORNEYS.

Patented June 13, 1944

2,351,454

UNITED STATES PATENT OFFICE 2,351,454

APPARATUS FOR FORMING SHOE HEELS

Joseph L. Pereles, Milwaukee, Wis., assignor to Pereles Bros., Inc., Milwaukee, Wis., a corporation of Wisconsin Application July 24, 1941, Serial No. 403,785

3 Claims. (Cl. 18—42)

This invention relates to improvements in the apparatus for forming shoe heels.

In the art of manufacturing shoe heels it has heretofore been proposed to mold or cast a plastic material shell or coating about a shaped wooden core but until the advent of the present invention certain objections and difficulties rendered such proposals impractical from a commercial standpoint. Materials of the plastic family may best be cast for commercial manufactures by injection molding in which extremely high pressures are utilized. Ordinarily, when it is attempted to coat a wooden form or core with a plastic applied under high pressures unusual problems arise. It is necessary to support a wooden core within a mold by pins extending into opposed ends of the core. If the molten plastic material is then fed into the mold under high pressure and with the usual direct feeding methods the pressure of the material will shift the core on its supporting pins with the result that the core may become deformed and with the further result that there will be an uneven application of the coating material to the walls of the core.

In a shoe heel of the coated core type it is absolutely essential that the wall thicknesses be uniform throughout. Unless this is true the product will be lopsided and unsightly and the final dimensions of the product may vary from those originally contemplated. It is also a fact that if certain molded wall portions of the heel are thicker than required it will take those portions longer to cool, thereby tying up the mold and apparatus for a period additional to that really required. Inasmuch as the molding equipment represents a very substantial investment, this difficulty would increase the cost of production of the articles and hamper the speed of operations.

With all of the foregoing objections and difficulties in mind a primary object of the present invention is to overcome the same by the provision of a novel molding apparatus for the production of shoe heels wherein molten coating material is cast about a supported wooden core under high pressures by indirect feeding, which prevents deflection of and distortion to the core, insures an even and rapid application of the molten material to the surfaces of the core, and is in other respects commercially practical, expeditious, and economical.

A further object of the invention is to provide an apparatus for forming molded shoe heels wherein the heel seat is entirely completed within the mold and when the heel is ejected from the mold it is a completed article, save for several minor rapid operations.

A further object of the invention is to provide an apparatus for forming shoe heels which are simple and economical, commercially practical and expeditious, which insure the production of uniform and perfect finished articles, and which are well adapted for the purposes described.

With the above and other objects in view the invention consists of the improved apparatus for forming shoe heels, and all of the parts and combinations, as set forth in the claims, and all equivalents thereof.

In the accompanying drawings in which the same reference characters indicate the same parts in all of the views.

Figure 1:
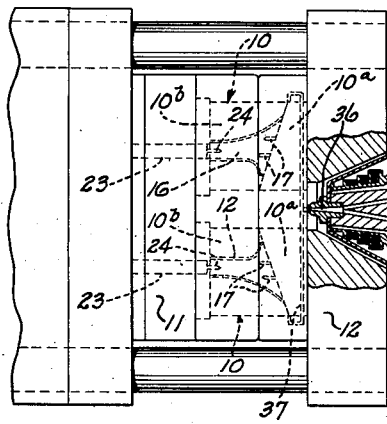
Fig. 1 is a part sectional, semi-diagrammatic view of a plastic injection molding machine with a plurality of improved molds associated therewith, the view showing a charge of molding material prior to injection into the heating cylinder.
Figure 2:
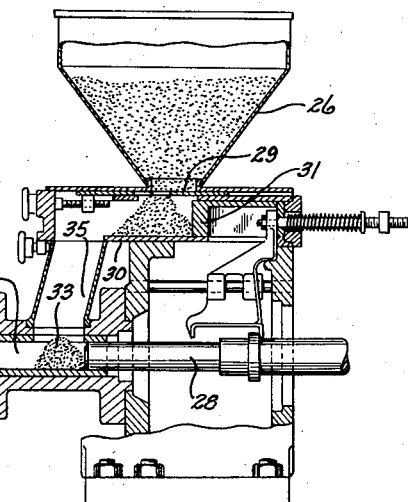
Fig. 2 is a similar part sectional semi-diagrammatic view of the injection portion of the molding machine showing a charge of molding material forced into the heating cylinder.
Figure 2:
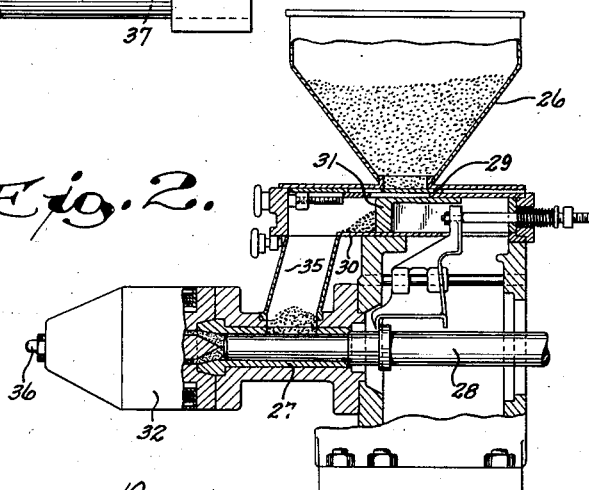
Figure 3:
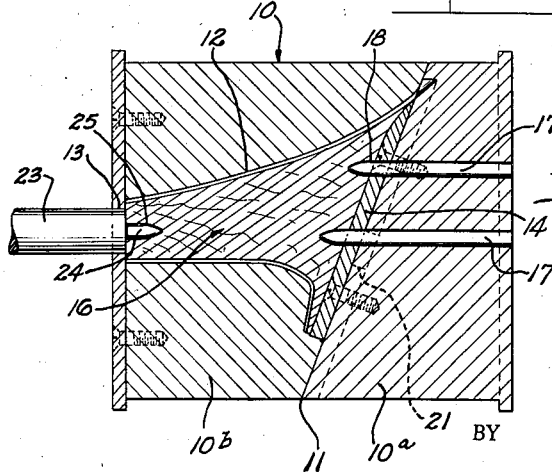
Fig. 3 is an enlarged longitudinal sectional view through an improved mold showing the manner in which a wooden heel core is supported therein.
Figure 5:
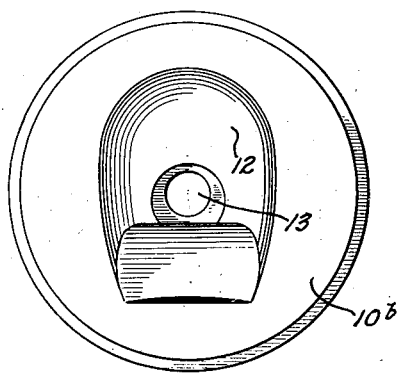
Fig. 5 is a similar inner face view of the other complementary separated section of the improved mold.

Referring now more particularly to the drawings it will be observed that in Figs. 1 and 2 there is illustrated portions of a plastic injection molding machine with which the improved shoe heel forming method may conveniently be carried out. Associated with the machine are one or more improved molds 10 which also constitute an important feature of the present invention.

In carrying out the improved method of forming core enclosed molded shoe heels, a plurality of heels may be cast simultaneously and for this purpose a suitable number of cylindrical molds 10 are clamped in spaced relation between die plates 11 and 12. A mold is shown in detail in Figs. 3, 4, 5 and 7 and it is of cylindrical shape, being formed of two separable, complementary sections 10a and 10b. The plane of separation 11 as between said sections 10a and 10b is oblique to the axis of the entire mold 10. The section 10b is formed with a tapered cavity 12 corresponding in size and shape to the size and shape of a finished shoe heel which is to be formed therein. The large end of the cavity is at the inner end 11 of the mold section while at the other end of the mold section, substantially centrally of the reduced end of the cavity, there is a circular opening 13 for the purpose hereinafter to be described.

The complementary mold section 10a is formed at its inner end with an inclined face having centrally thereon a raised heel seat forming portion 14. Said portion is adapted to receive thereagainst the dished or slightly concave heel seat portion 15 of a wooden heel core 16. The portion 14 of the mold section carries a pair of spaced and protruding metallic pins 17 adapted to enter apertures 18 in the heel seat of the core 16, these being some of the means for mounting and supporting the core within the mold sections and in proper position relative to the mold cavity. The same end face of the mold section 10a is formed with a substantially horse shoe shaped feed channel 19 spaced outwardly of and surrounding all but one edge portion of the heel seat forming plate 14. An intermediate portion of the channel 19 has communicating therewith a feed branch 20 which opens exteriorily of the mold. Between diametrically opposed portions of the feed channel 19 and opposite sides of the enlarged end of the mold cavity 12 there are ducts 21, and another duct 22 extends between an intermediate portion of the curved feed channel 19 and another portion of the mold cavity, the same being substantially equidistant between the ducts 21.

Having fitted one or more molds 10 with suitable wooden heel cores 16, the same are secured between the die plates 12 and 13 of the machine, as previously indicated. The die plate 12 carries plungers 23 whose inner ends are formed with protruding pins 24. The inner ends of the plungers 23 extend into the openings 13 in the outer ends of the mold sections 10b and the pins 24 engage in apertures 25 in the reduced or tapered ends of the cores 16. Hence, each core is supported in its mold by the pins 17 engaging the enlarged end of the core and a pin 24 engaging the reduced end of the core. The wood of the core is such that it might be deformed or mutilated if the core is subjected to uneven pressures. Hence, one of the features of the invention is the application of coating material to the exterior of the core and under high pressure in such a manner that there will be no uneven strains or stresses on the supported core such as would tend to shift the core on its mounting pins and then cause deformation of the core or unequal application of the coating material.

The injection molding machine, as shown in Figs. 1 and 2, includes a hopper 26. The material to be molded by the machine should be a thermo-plastic material such as cellulose acetate, or commercial compositions known in the trade as Lucite and Polystyrene. The selected moldable material of any of the types mentioned is originally in pulverulent form and a suitable batch of the same is disposed within the hopper 26. An important factor in the successful performance of the present method lies in the feeding of a predetermined quantity of the moldable material from the hopper for injection into the molds. That is to say, the batch of material for each operation of the machine must be determined with great accuracy as each batch of material must be the absolute correct amount for the coating of the cores in the molds. An excess of material will result in overloading of the mold cavities, whereby certain wall portions of the final heel might be too thick or lopsided, and an underloading will result in an uneven application of the material to the cores within the mold cavities and may produce heels which are not entirely coated.

In carrying out the invention it is therefore determined with great accuracy the exact amount of pulverulent material which is to be permitted to reach the feed cylinder or sleeve 27 prior to each injection stroke of a reciprocating feed plunger 28. This is accomplished by regulating the feed from the reduced end of the hopper 26 by an adjustable and movable gate or valve 29. The gate 29 is in a regulated open position when the parts are as shown in Fig. 1, whereupon a predetermined amount of the moldable material gravitates to a shelf 30 in advance of the pusher end of a reciprocatory feeder 31. In the position shown in Fig. 1 the plunger 28 is retracted and this is prior to the step of injecting a measured charge of material into a heating cylinder 32 and from there into the ducts and connections leading to the molds 10. Upon the next operation of the feed plunger 28 it will force the measured batch of material 33 adjacent its forward end within the sleeve 27 into various ducts or channels 34 within the heating cylinder 32, as illustrated in Fig. 2. At the same time the member 31 moves to the left relative to Figs. 1 and 2 and pushes into a chute 35 the measured batch of material which the opened gate had previously permitted to lodge on the shelf 30. The material which falls down the chute 35, while the plunger 28 is in the forward position, lodges above the plunger, as in Fig. 2, and upon subsequent retraction of the plunger this material falls into the sleeve 27 adjacent the forward end of the plunger, as in Fig. 1, ready for the next movement of the plunger.

While the charge of material is in the ducts in the heating cylinder 32 it is subjected to high melting temperatures and is converted into a fluid. The plunger 28 is operated in a conventional manner by oil pressure and builds up extremely high pressures on the material it acts against. While a charge of material in the heating cylinder 32 is being heated and melted the plunger 28 retracts and then reciprocates forwardly again with a new batch of pulverulent material. The pressure the plunger applies to this new batch of material in moving it into the heating cylinder reacts against the fluent material in the heating cylinder and forces it through the outlet end 36 thereof. This outlet end of the heating cylinder is connected by suitable tubes or pipes 37 with the feeding branches 20 for each of the molds 10.

Figure 4:
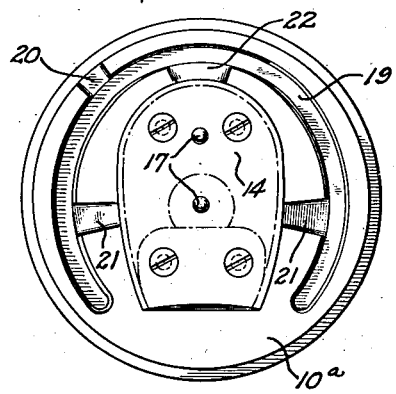
Fig. 4 is an inner face view of one section of the improved mold as separated from its complementary section.
Figure 7:
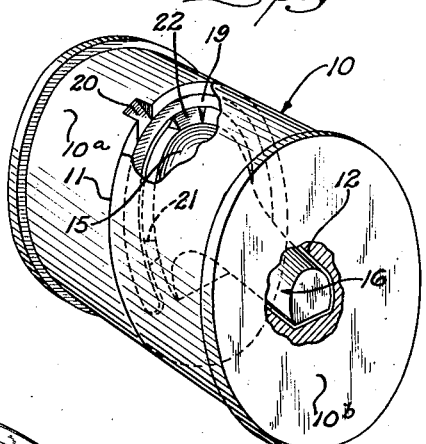
Fig. 7 is a perspective view of a closed mold with parts thereof broken away and in section showing the manner in which a wooden heel core is mounted therein and the relationship of the indirect feeding channels to the core.

As will be seen most clearly from Figs. 4 and 7 a mold 10 enclosing a core 16 has but a single feed entrance thereto, this being the branch 20 with which an end of a pipe or connection 37 extends. The entrance branch 20 registers with an intermediate portion of the horse-shoe indirect feeding channel 19. Hence, the molten molding material, under high pressure, flows rapidly into the channel 19 and flows therein uniformly in both directions simultaneously. The ducts 21 and 22 then conduct the molten material into the mold cavity and the material spreads and flows rapidly in all directions, coating all desired surface portions of the core and in an even layer to the extent permitted by the space between the outer surface of the core and the inner wall of the mold cavity 12. The amount of molten material which, for each injection stroke of the machine, is forced into the mold cavity is measured and is only enough to adequately coat all desired surfaces of the core in the required thickness. Due to the injection of a measured quantity of material, and due to the indirect feeding of this material via the channels 19, 21 and 22 so there may be a rapid and uniform flow and spread of the material on the desired surfaces of the core, a perfectly uniform and complete coating or jacket for the core is assured. The spaced, indirect feeding channels provide for simultaneous and uniform flow, under similar pressure conditions, all about the core so that there is no tendency for the core to be shifted on its pin mountings.

Figure 8:
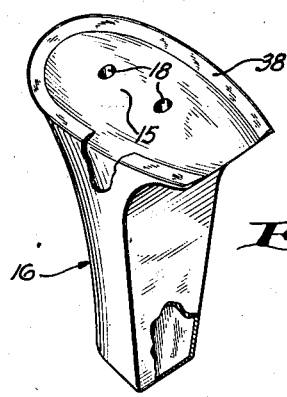
Fig. 8 is a perspective view, with parts broken away and in section of a completed core enclosed molded heel as produced according to the improved method.

As shown most clearly in Fig. 8 the molding material is intended to cover all side portions of the core 16 and will also flow to the extreme tapered end of the core and cover to some extent the small end thereof, although entire covering of said end of the core is not entirely essential because in commercial practice the heel is completed by the application of a separate tread member to the reduced end of the core. The molding material also overlaps the heel seat end of the core and forms a rim 38.

Figure 6:
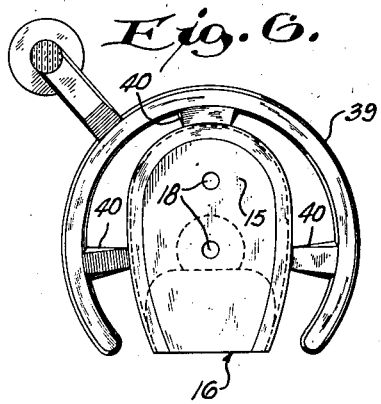
Fig. 6 is a view of the enlarged end of an improved molded heel as removed from the mold and showing the solidified material attached thereto which was lodged in the indirect feeding channels in the mold, which material is subsequently removed from the heel to complete the same.

After the injection stroke of the molding machine the feed plunger retracts, as previously indicated. For a short time interval the mold or molds 10 are allowed to cool. This period is relatively short because the thickness of the molten material about the core is uniform throughout and cooling, solidification, and slight contraction takes place uniformly about the entire core. At the end of the short cooling period the mold or molds are released from the die plates 11 and 12 and the respective sections of the mold or molds are then opened up to permit the removal of the cast heels. Fig. 6 illustrates a top end view of a molded heel as removed from a mold 10 and it will be noted that there is attached to the heel per se a figure of solidified material indicated by the numeral 39. This results from the solidification of material in the feed channels and ducts and it is merely necessary to cut or sever the webs 40 adjacent the heel surfaces, whereby the completed heel shown in Fig. 8 results. This severed excess material may subsequently be reground and re-used in the hopper 26. When the molded heels are removed from a mold cooling and solidification may be additionally facilitated by immersing the same in cold water or by any other suitable cooling method.

Aside from severing the web of excess material 39 the heel is practically completed as removed from the mold. It may only be necessary to add a standard heel tread to the reduced end of the heel. The heel seat is in the desired concave or dished form as the heel comes from the mold due to original pre-shaping of said end of the core and due to the shape of the plate 14 in the mold section 10a against which said end of the core is engaged during the molding operation.

Different shoes are of course of different lasts and it is essential that a heel tread be at a predetermined pitch to adapt the stance of the heel to the inclination of the heel seat. With a heel as produced by the improved method the same may be readily adapted to a shoe of any last. It is only necessary to cut or bevel the reduced end of the heel at a desired angle to adapt it to the pitch of the heel seat and this reduced end of the heel is of course fitted with a proper tread, as previously noted. The plastic material jacket or coating of the heel is one-piece and seamless and is maintained on the wooden core solely by virtue of the tight bond which results from slight shrinkage of the molding material as it cools.

Although, by way of illustration, the invention has been disclosed in connection with a certain shaped heel for a lady's shoe, it is obvious that the method of forming heels is equally applicable to heels of any desired shape and configuration.

It will be evident that the improved method of forming molded shoe heels is simple, novel, and commercial expeditious and that the improved mold used in carrying out the method provides for a novel and effective indirect feeding of molten material for uniform application of said material to a core within the mold. The invention is furthermore well adapted for the purposes described.

What is claimed as the invention is:

1. A cylindrical permanent mold, comprising a pair of endwise separable, complementary, metallic, mold sections having complementary faces, only one of the mold sections having an elongated tapered cavity therein, means extending axially of the mold sections for supporting a core within said cavity of one mold section in uniform spaced relation from the side walls surrounding the cavity and against the complementary face of the other mold section, a fluid conducting channel formed within the face of said other mold section following the contour of and extending partially around the periphery of the enlarged end of the mold cavity, a plurality of spaced feeding ducts within said mold section affording separate fluid communications between selected portions of said channel and spaced portions of the mold cavity, and a fluid inlet duct extending into the mold and registering with an intermediate portion of said channel.

2. A permanent mold, comprising a pair of endwise separable, complementary mold sections, the plane of division of said mold sections being in a plane oblique to the axis of the mold, one of the mold sections having an elongated tapered cavity therein; the oblique end of the complementary section having a raised plate, means for supporting a heel-shaped core within said cavity in uniform spaced relation from certain wall portions thereof and with an end of the core against said raised plate, a horseshoe shaped fluid conducting channel formed on the oblique face of the complementary mold section, a plurality of spaced feeding ducts in said face of the same section affording separate fluid communications between selected portions of said channel and spaced portions of the mold cavity, and a fluid inlet duct extending into the mold and registering with an intermediate portion of said channel.

3. A permanent mold, comprising a pair of endwise separable, complementary mold sections, the plane of division of said mold sections being oblique to the axis of the mold, one of the mold sections having an elongated tapered cavity therein and the other having a face portion closing an end of the cavity, means for supporting a heel-shaped core within said cavity in spaced relation from certain wall portions thereof and against said face portion, a curved fluid conducting channel formed in said face portion, a plurality of spaced feeding ducts in the same face portion affording separate fluid communications between selected portions of said channel and spaced portions of the mold cavity, and a fluid inlet duct extending into the mold and registering with an intermediate portion of said channel.

JOSEPH L. PERELES.